Patented Oct. 23, 1945

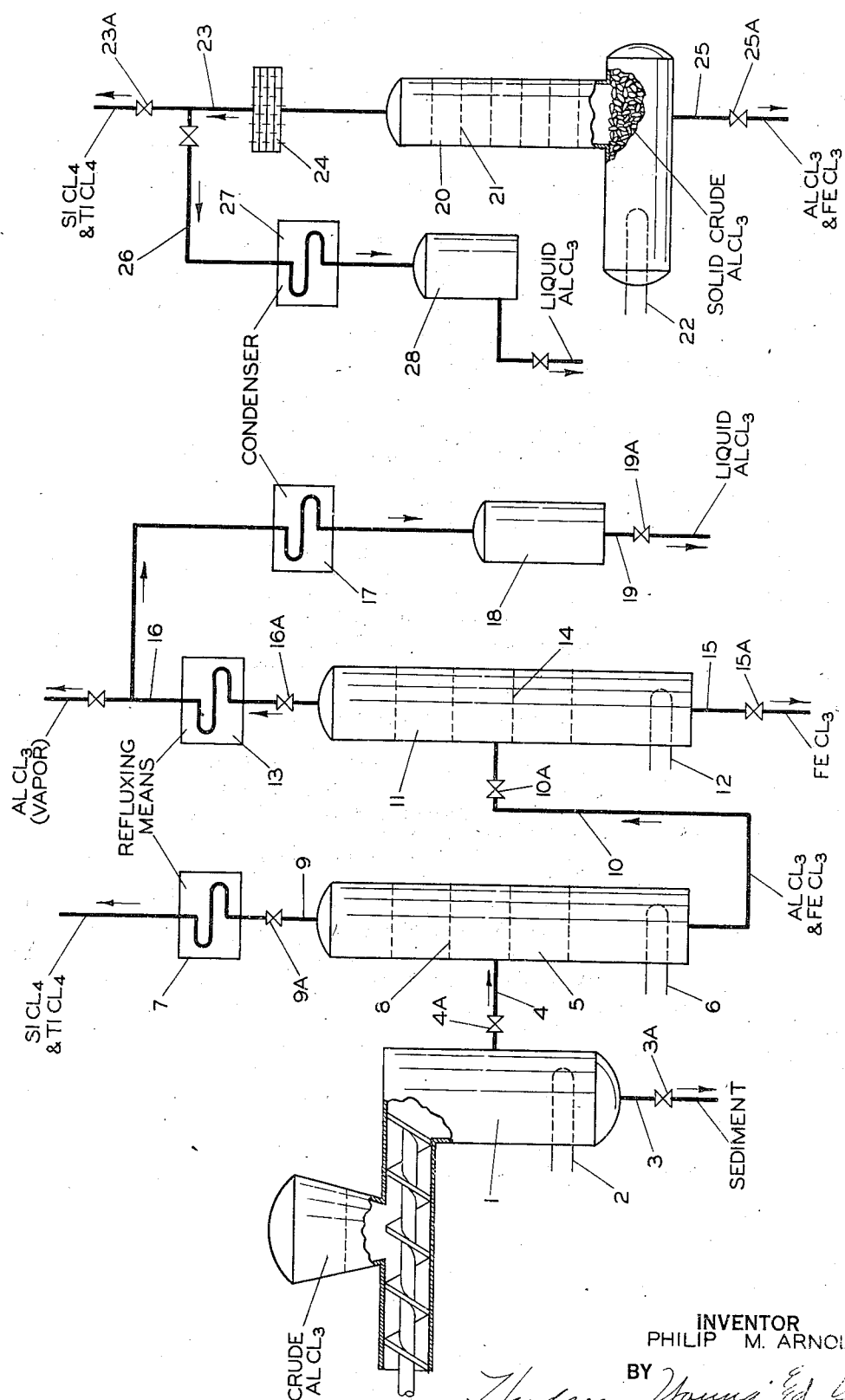

2,387,228

UNITED STATES PATENT OFFICE 2,387,228

METHOD OF PURIFYING ANHYDROUS ALUMINUM CHLORIDE

Philip M. Arnold, Bartlesville, Okla., assignor to Phillips Petroleum Company, a corporation of Delaware Application August 10, 1942, Serial No. 454,327

3 Claims. (Cl. 23—93)

In the commercial preparation of anhydrous aluminum chloride from bauxite and other aluminiferous ores, ferric chloride, silicon tetrachloride, and titanium tetrachloride may be and usually are produced during halogenation. The amount of these impurities produced will vary with the amount of impurities in the original ore, treatment of the ore before halogenation, the method of halogenation, subsequent treatment of the resulting halogenation products, etc., which need not be described here. However, as an example to indicate the extent to which these impurities occur in an aluminiferous ore, such as is used for the preparation of commercial anhydrous aluminum chloride, the following typical analysis of a bauxite ore is given:

| Component | Weight per cent |
|---|---|
| $Al_2O_3$ | 40.0 |
| $Fe_2O_3$ | 17.0 |
| $SiO_2$ | 20.0 |
| $TiO_2$ | 1.5 |
| $H_2O$ | 19.5 |
| Other components | 2.0 |
|  | 100.0 |

The usual commercial processes for the separation of impurities, such as ferric chloride, titanium tetrachloride, silicon tetrachloride, etc., from aluminum chloride involves physical and/or chemical treatments or both. For most purposes sufficiently complete separation of titanium and silicon tetrachloride from aluminum chloride can be effected by simply heating the impure aluminum chloride to the boiling temperatures of the silicon and titanium tetrachloride and driving them off as gases leaving a residue consisting essentially of aluminum and ferric chlorides. Since the sublimation temperature of aluminum chloride is below the boiling temperature of ferric chloride, a certain amount of separation of these two components from each other can be effected by simple sublimation. However, sublimation does not give a very complete separation, because ferric chloride is volatile enough at the sublimation temperature of aluminum chloride that appreciable amounts will sublime with the aluminum chloride. Consequently, the usual practice for separating aluminum chloride and ferric chloride to obtain pure aluminum chloride is to treat the mixture chemically in such a way as to convert the ferric chloride to a less volatile compound, or even to metallic iron, and separate the aluminum chloride by sublimation. A number of such aluminum chloride purification processes are described in the literature.

In this invention the principle of fractional distillation is applied for the purification of crude aluminum chloride. This can be done provided enough pressure is maintained on the fractionating system to prevent sublimation of the crude aluminum chloride. When sufficient pressure is applied, it is possible to melt the aluminum chloride to a liquid and thereby obtain a vapor-liquid equilibrium while at atmospheric pressure it is very difficult to melt aluminum chloride to obtain a vapor-liquid equilibrium because it tends to sublime giving a solid-vapor equilibrium. However, before fractional distillation can be very intelligently applied, it is necessary to know some of the physical characteristics of the components to be fractionated. Consequently, for convenience of reference, the following data from various sources in the literature are tabulated:

Aluminum chloride (anhydrous)

Melting point, °C _____ 190 at 1,900 mm.
Boiling point, °C _____ 183 (sublimes)
Critical temperature, °C _____ 356

| Vapor pressure | |
|---|---|
| T, °C. | P, mm. |
| 167.8 | 250.8 |
| 171.1 | 311.6 |
| 175.7 | 433.2 |
| 182.7 | 752.4 |
| 204.2 | 1,801.2 |
| 207.5 | 2,006.4 |
| 213.0 | 2,736.0 |

Heat of fusion 19,200 g. cal./mol.
Heat of vaporization (liquid) 9,600 g. cal./mol.

Ferric chloride (anhydrous)

Melting point, °C _____ 282–306
Boiling point, °C _____ 315
Critical temperature, °C _____ 650–700

| Vapor pressure | |
|---|---|
| T, °C. | P, mm. |
| 310 | 649.8 |
| 370 | 1,550.4 |
| 403 | 2,515.6 |
| 493 | 6,916.0 |

Heat of fusion (g. cal./mol.) 21,800.

| Heat of vaporization | |
|---|---|
| T, °C. | G. cal./mol |
| 256.9 | 29,410 |
| 270.7 | 30,590 |
| 288.2 | 32,480 |
| 301.4 | 34,110 |
| 309.2 | 35,090 |
| 315.0 | 35,470 |

*Silicon tetrachloride*

Melting point, °C _____ 70
Boiling point, °C _____ 59.6
Critical temperature, °C _____ 230

| Vapor pressure | |
| --- | --- |
| T, °C. | P, mm. |
| 0 | 7.802 |
| 10 | 12.590 |
| 30 | 29.449 |
| 50 | 60.746 |
| 60 | 83.723 |
| 65 | 97.274 |

Heat of vaporization 7946.2 g. cal./mol.

*Titanium tetrachloride*

Melting point, °C _____ 30
Boiling point, °C _____ 136
Critical temperature, °C _____ 358

| Vapor pressure | |
| --- | --- |
| T, °C. | P, mm. |
| 20 | 10.05 |
| 30 | 16.70 |
| 40 | 26.50 |
| 50 | 41.15 |
| 60 | 62.15 |
| 70 | 92.95 |
| 80 | 134.00 |
| 90 | 190.65 |
| 100 | 264.55 |
| 110 | 367.15 |
| 120 | 493.80 |
| 130 | 652.30 |
| 135 | 740.75 |

| Heat of vaporization | |
| --- | --- |
| T, °C. | G. cal./mol. |
| 25 | 8,960 |
| 136 | 8,620 |

From the preceding physical data, the following brief summary can be obtained either directly or by extrapolation:

| | Melting point, °C. | Boiling point °C | Critical temp., °C. | Critical pressure | Vapor pressure |
| --- | --- | --- | --- | --- | --- |
| | | | | Atm. | Atm. |
| $SiCl_4$ | −70 | 59.6 | 230 | 2.86 | [1] 2.86 |
| $TiCl_4$ | −30 | 136 | 358 | 27.63 | [1] 4.74 |
| $AlCl_3$ | [2] 190 | 182.7 | 356 | 210 | [1] 6.30 |
| $FeCl_3$ | 282–306 | 315 | 650–700 | 45–50 | [1] 0.145 |

[1] Temp. of 230° C.
[2] Pressure of 2.5 A. T. M.

Further aluminum halide constants are as follows:

$AlBr_3$ _____ 97.5     263.3 (747 mm.)
$AlI_3$ _____ 185     350+
$AlF_3$ _____ 1,040     1,260 (sublimes)

This invention can be practiced either batchwise or continuously. Continuous operation will usually be preferable. In either modification it is necessary to melt the solid impure aluminum chloride and bring the molten mass up to the boiling temperature. In view of the boiling point data in the preceding tabulations, and the fact that aluminum chloride will usually be in considerable excess of the ferric chloride, the boiling temperature of the mixture will probably be in the neighborhood of 200 to 250° C. (392 to 482° F.), slightly above the boiling temperature of aluminum chloride. As previously stated, the process will have to be conducted in a closed system under pressure to prevent sublimation.

The invention will be more readily understood by referring to Figure 1 which is an embodiment of the invention depicting continuous operation. Granular, powdered, etc., crude anhydrous aluminum chloride from an aluminum chloride supply is charged, by any suitable means such as a screw conveyor into a closed melting pot 1 which is under a pressure exceeding the vapor pressure of the crude aluminum chloride at its melting temperature. The melting pot and subsequent equipment for handling liquid crude aluminum chloride and the products separated from it are made of suitable materials of construction to withstand the corrosive and erosive action of these products. The crude aluminum chloride is heated by any suitable method such as a heating coil 2 or steam jacket, electric heaters, etc., to a temperature sufficiently high to melt the crude aluminum chloride. Sediment is drawn off from the bottom through line 3 equipped with valve 3A. The melted crude aluminum chloride is fed through line 4 having valve 4A to fractionating column 5 which is equipped with a reboiler 6, a refluxing means 7, and sufficient plates 8 to effect the desired separation. The temperature and pressure conditions in column 5 are maintained such that a vapor-liquid equilibrium is established, thereby making it possible to fractionate the crude aluminum chloride into an overhead fraction and a bottom fraction. The overhead fraction will consist mainly of silicon and titanium tetrachloride and other light impurities which are discharged from the system to waste disposal or to storage, or to other equipment for further processing through line 9 having valve 9A. The bottom fraction of column 5 will consist mainly of aluminum and ferric chloride and other heavier products in the liquid state. This fraction is charged through conduit 10 and valve 10A to fractionating column 11 equipped with a reboiler 12, a means 13 for supplying reflux to the column, and a sufficient number of plates 14 to effect the desired separation. The temperature and pressure conditions in column 11 are maintained such that a vapor-liquid equilibrium is established in the column, thereby making it possible to fractionate the aluminum chloride-ferric chloride mixture into an overhead fraction of pure aluminum chloride and a bottom fraction of ferric chloride and other heavy impurities. The ferric chloride fraction is discharged from the system through conduit 15 and valve 15A to waste disposal, storage, or to equipment for further processing, etc. The purified aluminum chloride may be taken off the top of column 11 through cooler 13, line 16 having valve 16A while still under pressure and condensed in condenser 17 to a liquid which is collected in accumulator 18. The liquid aluminum chloride still under pressure may be withdrawn through line 19 having valve 19A (pressure to be maintained until aluminum chloride is cooled below its sublimation temperature) and placed in molds, tanks, vats, etc., and allowed to solidify. The handling of the liquid aluminum chloride in preparation for solidification will depend upon the eventual use that is to be made of the aluminum chloride. If it is to be used as a catalyst in hydrocarbon conversion processes, it will probably be desirable to allow the liquid to solidify in molds which will give definite and uniform lump or particle sizes, etc. Also, if desired, the aluminum chloride may be taken off the top of column 11 as a vapor, still under pressure, and by proper flashing and cooling steps condensed to a fine powder.

Figure 2 shows a modification of the invention involving a batch process. The general principle of operation is identical with that shown in Figure 1, except that the solid anhydrous commercial aluminum chloride is charged in batches directly to the kettle of still 20 provided with a number of plates 21 and a heating coil 22, and melted therein. The temperature and pressure are adjusted to give the desired primary separation; that is, an overhead fraction consisting mainly of lighter components such as silicon and titanium tetrachloride through line 23, valve 23A and cooler 24, and a bottom fraction consisting mainly of aluminum and ferric chloride. As before, the overhead fraction is sent to disposal, storage, further processing, etc. The bottom fraction from the primary separation is retained in the kettle of this same column where it is subjected to the proper temperature and pressure conditions to effect a separation into an overhead fraction of pure aluminum chloride and a kettle product consisting mainly of ferric chloride and heavier products. The kettle product may be sent to disposal, storage, further processing, etc. The aluminum chloride vapors may be removed overhead through line 23 and line 26 to accumulator 28 and withdrawn from accumulator 28 as a liquid or the aluminum chloride may be removed as a vapor through line 23 and valve 23A. If desired, the aluminum chloride may be processed in the same manner described for Figure 1, that is, made into a powder, lumps, pellets, etc.

The process, although particularly applicable to aluminum chloride, is also feasible for the separation of other aluminum halides such as aluminum bromide and aluminum iodide from the corresponding impurities resulting from the halogenation of aluminiferous ores, aluminum metal, aluminum scrap, etc. While it is ordinarily preferred to carry out the fractional distillation of aluminum chloride at pressures of 2.5 atmospheres and higher, pressures as low as 1.5 or 1.6 atmospheres may be employed with success.

One skilled in the art can readily see that the above described process can be practiced in other modifications without departing from the spirit of the invention, and therefore, the above description and figures are not to be construed to limit the invention to these described modifications. For example, this invention, fractionation of crude commercial anhydrous aluminum chloride to purify the same, could be practiced without melting pot 1, shown in Figure 1, provided liquid aluminum chloride were available from some other source for feed to the fractionating columns. This could be possible in connection with an aluminum chloride manufacturing plant wherein the effluent aluminum chloride is expelled as a liquid. Also, in those instances where it is known that products more volatile than aluminum chloride are not present in the crude aluminum chloride, it is possible to dispense with the fractionating column used for fractionating out the products more volatile than aluminum chloride and still effect the purification of the aluminum chloride without departing from the spirit of the invention. Likewise, in those instances where no impurities less volatile than aluminum chloride are present, one fractionator can be eliminated. By practicing the process of the present invention aluminum chloride of 99 per cent or higher purity may be recovered.

I claim:

1. The process of separating aluminum chloride from a mixture comprising aluminum chloride, ferric chloride, silicon tetrachloride, and titanium tetrachloride which comprises the steps of charging said mixture into a vessel, maintaining a superatmospheric pressure in said vessel, melting the contents thereof, and subjecting said mixture to fractional distillation to remove gaseous silicon and titanium tetrachlorides, separating a liquid mixture comprising aluminum chloride and ferric chloride as a bottom product of said distillation, further fractionally distilling said liquid mixture under superatmospheric pressure to separate the ferric chloride as a liquid product, and recovering relatively pure aluminum chloride.

2. The process of separating aluminum chloride from a mixture comprising aluminum chloride, ferric chloride, silicon tetrachloride, and titanium tetrachloride which comprises the steps of melting said mixture, subjecting said mixture to fractional distillation under a pressure in excess of the vapor pressure of said mixture at its melting temperature to remove gaseous silicon and titanium tetrachlorides, separating a liquid mixture comprising aluminum chloride and ferric chloride as a bottom product of said distillation, subjecting said liquid mixture to further fractional distillation under pressure for the separation of the ferric chloride as a liquid product, and recovering relatively pure aluminum chloride.

3. The process of separating aluminum chloride from a mixture comprising aluminum chloride, ferric chloride, silicon tetrachloride, and titanium tetrachloride comprising the steps of charging said mixture into a vessel, melting the aluminum chloride under pressure, subjecting said mixture to fractional distillation under a pressure in excess of the vapor pressure of said mixture at its melting temperature to remove gaseous silicon and titanium tetrachlorides, separating a liquid mixture comprising aluminum chloride and ferric chloride as a bottom product of said distillation, subjecting said liquid mixture to further fractional distillation under pressure for the separation of the ferric chloride as a liquid product, separating relatively pure aluminum chloride as a gaseous overhead product, and condensing said gaseous aluminum chloride to recover same.

PHILIP M. ARNOLD.

CERTIFICATE OF CORRECTION.

Patent No. 2,387,228. October 23, 1945.

PHILIP M. ARNOLD.

It is hereby certified that error appears in the printed specification of the above numbered patent requiring correction as follows: Page 2, first column, line 2, for "70" read -- -70 --; line 19, for "30" read -- -30 --; and that the said Letters Patent should be read with this correction therein that the same may conform to the record of the case in the Patent Office.

Signed and sealed this 5th day of February, A. D. 1946.

Leslie Frazer (Seal)              First Assistant Commissioner of Patents.